United States Patent [19]

Zawodny

[11] 4,211,479
[45] Jul. 8, 1980

[54] FILM ADVANCE MECHANISM

[75] Inventor: Arthur Zawodny, Budd Lake, N.J.

[73] Assignee: Keystone Camera Corporation, Clifton, N.J.

[21] Appl. No.: 889,240

[22] Filed: Mar. 23, 1978

[51] Int. Cl.² ............................................. G03B 1/08
[52] U.S. Cl. ................................................... 354/213
[58] Field of Search ............... 354/213, 206, 204, 187, 354/212, 207

[56] References Cited

U.S. PATENT DOCUMENTS

| | | |
|---|---|---|
| 3,747,494 | 7/1973 | Peters ................................. 354/213 |
| 3,769,891 | 11/1973 | Hackenburg et al. ............... 354/213 |
| 3,774,513 | 11/1973 | Ettischer et al. ................ 354/213 X |

FOREIGN PATENT DOCUMENTS 1145913 3/1963 Fed. Rep. of Germany ........... 354/204

*Primary Examiner*—John Gonzales
*Attorney, Agent, or Firm*—Neuman, Williams, Anderson & Olson

[57] ABSTRACT

A camera including a film advance mechanism having a film advance plunger which is mounted for reciprocal movement from a rest position to a depressed position for operating the film advance mechanism to move film along an exposure plane and coil it about a take up spool. A film metering finger connected to said film advance mechanism and movable from a retracted position on one side of the exposure plane to an extended position traversing the exposure plane. Film is advanced by depressing the plunger. When the metering finger senses a perforation in the film at a predetermined location, movement of the finger disables the film advance mechanism to prevent further film advancement, even though plunger movement may continue. This disabling is accomplished by separating two adjacent and substantially collinear members which connect the plunger to a ratchet drive mechanism that rotates a film take-up spool. The film advance mechanism is re-enabled as or after the shutter release button is depressed to expose the film.

15 Claims, 3 Drawing Figures

FILM ADVANCE MECHANISM

BACKGROUND OF THE INVENTION

The invention relates to cameras which can use film having metering perforations and to mechanisms to advance and position said film automatically by sensing said perforations, regardless of the number of times the film advance lever is operated by the picture taker.

Since the advent of film with said metering perforations, solid body or non-expanding cameras with film advance mechanisms actuated by plungers have become well known in the art. These mechanisms are generally typified as follows. After the picture taking button is depressed to expose the film in the exposure gate, the film advance plunger is reciprocally moved to operate a film advance mechanism and advance the film along the film plane past the exposure gate until a succeeding frame of unexposed film is positioned in said gate. As the succeeding frame is positioned, a metering finger detects the presence of the metering perforation in the film by traversing the film plane through the perforation or by moving in the direction of film movement after traversing the film plane. This movement usually locks the film advance means and thereby prevents further reciprocation of the film advance plunger. Locking or preventing movement of said plunger has, on occasion, resulted in damage to delicate camera mechanisms when the unknowing operator mishandles or forces further operation. Depending upon the operation of the particular film metering system, the metering finger often remains in the film metering perforation which has additionally resulted in tearing the film when further film movement is forced beyond that normally allowed.

Mechanisms of this type, which suffer from these deficiencies, are disclosed in the following U.S. patents. U.S. Pat. No. 3,769,891, issued to Hackenburg et al. discloses a film advance mechanism which blocks further rotation when the film metering finger 12d senses a film perforation and causes pallet 16b to engage teeth 104 on film transport member 4 and thereby lock the mechanism to prevent further movement. U.S. Pat. No. 3,747,494, issued to Peters discloses a film advance mechanism which blocks further rotation when the film metering finger 106 senses a film perforation and causes pawl 98 to engage the teeth of ratchet 100 to prevent the rotation of gear 38 and movement of the film advance lever 22.

In addition to the drawbacks described in the prior art, the recent popularity of expanding or so-called push-pull cameras has created a greater urgency for a film advance mechanism actuated by reciprocal motion that does not lock when the film has been advanced the appropriate distance, but rather disengages or disables the film advance mechanism to allow continued reciprocal movement without continued film advance. These cameras expand for picture taking and collapse for easy storage of the camera and the protection of lenses and operating surfaces. Film advance is coupled to the opening and closing of the camera. Therefore, locking the film advance would prevent any opening or closing of the camera once an unexposed frame was positioned in the exposure gate. Further, if the film advance did not disengage once the succeeding film frame was positioned, each opening and closing of the camera would advance the film one frame, wasting many unexposed frames and restricting the utility of the camera. U.S. Pat. No. 3,968,509, issued to Winkler et al. and U.S. Pat. No. 3,825,939 issued to Engelsmann et al. are directed to accomplishing these results, but both require a complex planetary transmission including many difficult and exacting manufacturing and assembly operations. The present invention accomplishes these results with a relatively simple mechanism which is easy to manufacture and assemble and is trouble free in operation.

It is an object of the present invention to provide a camera with a film advance mechanism useable with film having pre-punched positioning perforations.

It is a further object of the present invention to provide a camera with a film advance mechanism which is operated by reciprocal action of a plunger.

It is a further object of the present invention to provide a camera with a film advance mechanism which disengages the film advance mechanism in response to the sensing of a film perforation, yet does not lock the mechanism and still permits reciprocation of the plunger without resulting in further film advancement.

SUMMARY OF THE INVENTION

The invention relates to a still camera, particularly one suited for use with roll film having a row of perforations, one for each film frame, and a mechanism to advance said film. The film advance mechanism includes a reciprocating drive means comprising two adjacent and substantially collinear members, the first movable with respect to the second from an enabled position to a disabled position. In the enabled position the two members move in unison; in the disabled position the first member may reciprocate independently of the second. A metering means is movable between a retracted and an extended position, said metering means sensing the presence of a film perforation at a predetermined position by moving to the extended position. A drive disabling means is movable from a rest position to an extended position in response to the movement of the metering means to an extended position. The extension of the drive disabling means causes the first member of the reciprocating drive means to move to the disabled position allowing reciprocation of said first member independently of said second member. Drive re-enabling means are movable to allow the first member of the reciprocating drive means to move to the enabled position.

DESCRIPTION OF THE PREFERRED EMBODIMENT

Because cameras are well known in the art, and specifically cameras using film with perforations for positioning said film, the present disclosure will be directed primarily to the film advance apparatus. Many of the well known devices for sensing said film perforations are compatible with the present invention and may be adapted to cooperate with it by one skilled in the art of camera design. Further, any references to specific mechanisms are illustrative only. It will be understood that variations, modifications, and the substitution of equivalent mechanisms can be effected within the scope of this invention.

Figure 1:
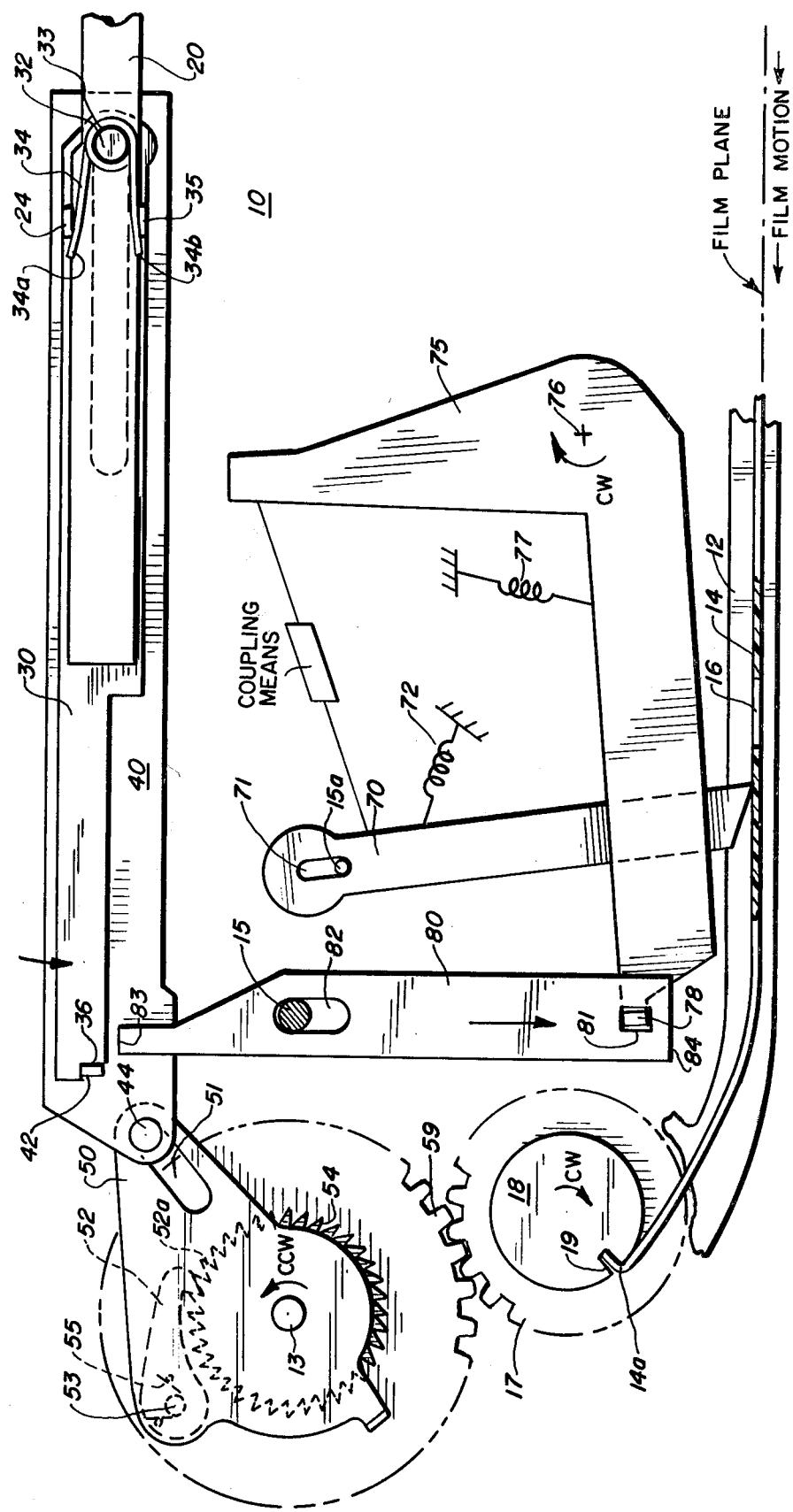
FIG. 1 is an elevational view of a portion of a camera body incorporating a film advance mechanism embodying the present invention with the mechanism in the enabled state to advance film.

Referring now to FIG. 1, the camera illustrated as the preferred embodiment has a housing 10 adapted to accept a film cartridge, partially shown at 12, containing roll film 14 with film positioning perforations along one edge, such as illustrated at 16. The film cartridge may be of the type commonly known in the art wherein the rotation of a take up spool 18 advances the film in a predetermined direction to place an unexposed film frame in the exposure gate (not shown) of the camera.

Figure 2:
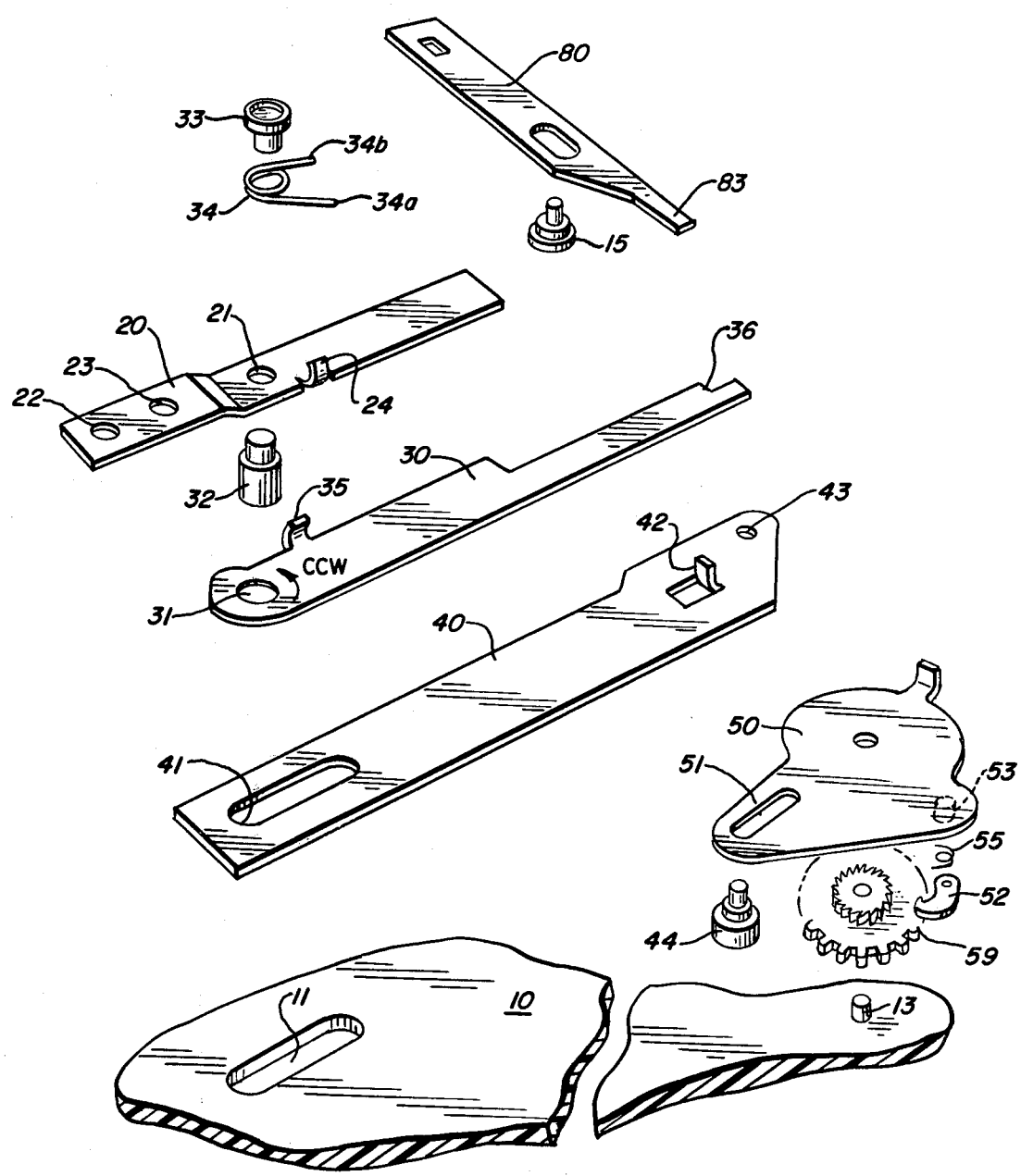
FIG. 2 is an exploded view of certain parts of the film advance mechanism shown in FIG. 1.

In FIG. 1 and FIG. 2, a plunger 20 is pivotally connected to a drive arm 30 at openings 21 and 31, respectively, by a pivot stud 32. Stud 32 is held in position by a collar 33. A slide arm 40 is also connected to drive arm 30 by pivot stud 32 at a slot 41 so that both plunger 20 and drive arm 30 slide longitudinally in unison with respect to slide arm 40 as constrained by the motion of stud 32 in slot 41. In addition, drive arm 30 rotates independently about stud 32 at opening 31 with respect to plunger 20 and slide arm 40. The lower portion of stud 32 rests in a groove 11 in camera body 10. The groove is of substantially the same dimensions as slot 41 on slide arm 40, and permits arm 20, 30 and 40 and stud 32 to move reciprocally along the length of the groove.

Openings 22 and 23 in plunger 20 provide convenient means for attaching an external film advance lever or other means external to the camera and accessible to the picture taken for reciprocal movement to advance the film. It may also be attached to one portion of a reciprocating camera housing. By limiting the external film advance means to reciprocal movement and connecting said external means to plunger 20, the movement of plunger 20 is substantially restricted to longitudinal movement in the direction of its length.

A torsion spring 34 is positioned around collar 33 and has an end 34A biased against a plunger tab 24 extending from one side of plunger 20. The other end 34B of spring 34 is biased against drive arm tab 35 extending from one side of drive arm 30. The force exerted by the torsion spring 34 urges drive arm 30 counterclockwise about pivot stud 32 as shown in FIG. 2 so that a notch 36 in drive arm 30 is continually biased into engagement with a tab 42 upstanding from slide arm 40.

Slide arm 40 is pivotally connected to a ratchet drive plate 50 at ratchet slot 51 by drive stud 44. Ratchet plate 50 pivots about a shaft 13 which may be a portion of th camera body 10. Ratchet plate 50 further carries ratchet pawl 52, rotatably mounted on ratchet post 53 and is continually biased into engagement with the teeth of a ratchet gear 54 by torsion spring 55, which is fitted on ratchet post 53. Ratchet gear 54 may be directly connected to or interconnect to a film advance gear 59 so that movement of ratchet gear 54 causes rotation of film gear 59. Film gear 59 engages and drives a cartridge gear 17, which is a part of film cartridge 12 (see FIG. 1). A spool 18 is connected or attached to gear 17 and rotates therewith. Film end 14A may be placed in a slot 19 in spool 18 or attached by tape or other suitable means. Film end 14A is coiled about spool 18 and is drawn through the cartridge and across the exposure gate as the film is advanced.

A metering finger 70 is provided for metering the film. Finger 70 is movably attached to camera body 10 by post 15A attached to and extending from body 10. Finger 70 is provided with an elongated slot 71 through which post 15A extends. Finger 70 is biased toward the film 14 and against the direction of film advance by a spring 72, but it is maintained in its retracted position as it bears against the film 14. Finger 70 moves to its extended position when it engages a film perforation 16 and traverses the film plane. Continued movement of the film 14 draws metering finger 70 along therewith. Such movement of finger 70 allows metering lever 75 to rotate clockwise about pin 76 in the direction of the bias exerted by a spring 77 by removing an impediment in response to the movement of finger 70. Coupling means to couple lever 75 to make it responsive to the operation or position of finger 70 is well known in the art. See, for example, U.S. Pat. No. 3,747,494, FIGS. 1 through 3, and column 3, lines 48-61; and U.S. Pat. No. 3,769,891, FIGS. 1 and 2, and column 2, line 60 through column 3, line 59. Such coupling is not a part of the present invention, although it is necessary and desirable for use with film utilizing perforations for sensing and positioning each succeeding frame in the exposure gate.

Figure 3:
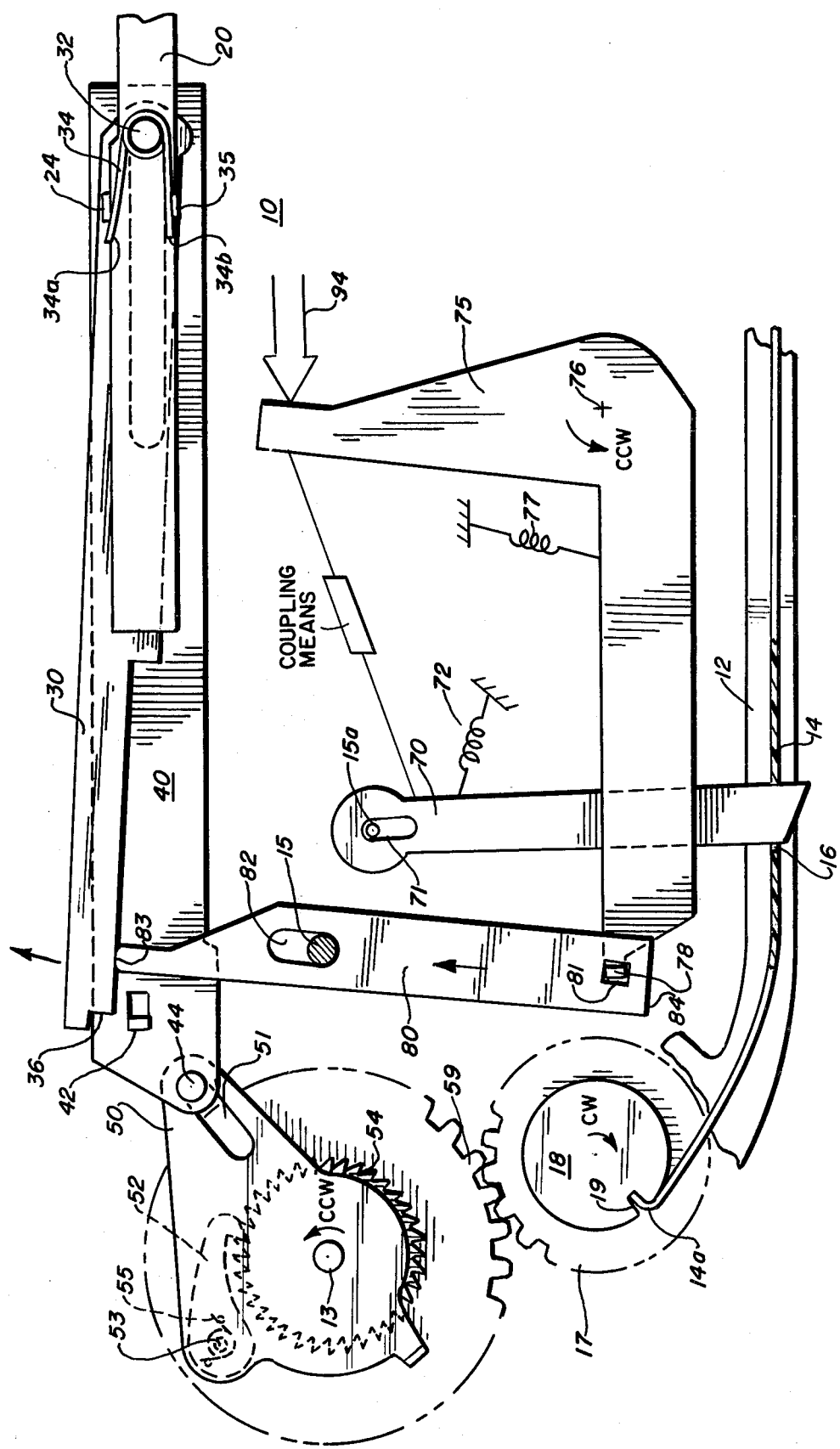
FIG. 3 is an elevational view of a portion of a camera body disclosing the film advance mechanism of FIG. 1 in the disabled state.

Referring now to FIGS. 2 and 3, a disengaging member 80 is positioned substantially perpendicular to drive arm 30. The first end 84 of lever 80 has an aperture 81 to receive tab 78 of lever 75. The second end 83 of lever 80 engages the end of drive arm 30 nearest drive tab 42. Mediate the ends of lever 80 is slot 82 which straddles a post 15, which may be a part of the main camera body 10. Tab 78 of lever 75 is inserted into aperture 81 at the first end of member 80. Thus, member 80 moves in response to lever 75 and slides in a direction substantially perpendicular to said arm 30 from a retracted position shown in FIG. 1 to an extended position as shown in FIG. 3. In FIG. 1 member 80 is shown in its retracted position where it does not interfere with any operation of the film advance mechanism, i.e. plunger 20, arms 30 or 40, or the ratchet and drive assemblies 50 and 59. This allows continuous flow advance in response to the reciprocation of plunger 20. When metering finger 70 moves to a position traversing the film plane, as shown in FIG. 3, it causes lever 75 to rotate clockwise and slide member 80 to its extended position. Second end 83 engages and forces arm 30 to rotate in a clockwise direction about stud 32, overcoming the bias of spring 34. Said rotation disengages notch 36 from drive tab 42 and thereby disables the film advance mechanism by interrupting the connection between plunger 20 and slide arm 40. As plunger 20 continues to reciprocate pivot stud 32 slides in slot 41 of slide arm 40. As long as member 80 remains in its extended position, arm 30 will rub against end 83 of arm 80, out of contact with tab 42; therefore, repeated operation of plunger 20 has no effect on the ratchet drive and prevents further film advance. This continues until member 80 is retracted to its first position, as explained in the following paragraph, and the bias exerted by spring 34 against tab 35 on arm 30 causes notch 36 to again engage tab 42 to complete the drive train between plunger 20 and slide arm 40.

Member 80, whose operation is directly related to the position of metering finger 70 as noted above, preferably remains in the extended position until the camera shutter release button (not shown) has been activated to expose the film frame associated with the particular film perforation traversed by finger 70. Activation of the shutter release operates to move member 80 back to its retracted position. One manner is by exerting a force 94 (see FIG. 3) to rotate lever 75 counterclockwise about pin 76 causing tab 78, situated in aperture 81, to draw member 80 to its retracted position. This causes notch 36 to reengage drive tab 42, due to the bias of spring 34, for further film advance. Lever 80 remains in its retracted position due to the coupling means coupling finger 70 to lever 75. Such mechanisms are well known in the art and have been omitted for clarity. As noted before, see, for example, U.S. Pat. No. 3,747,494, FIGS. 1 through 3, and column 3, lines 48-61; and U.S. Pat. No. 3,769,891, FIGS. 1 and 2, and column 2, line 60 through column 3, line 59.

In a typical film advance operation, plunger 20 is slidably actuated or depressed causing pivot stud 32 to slide in slot 41 in arm 40 and slot 11 in camera body 10. The reciprocation of pivot stud 32 causes drive arm 30 to reciprocate therewith due to said arm's connection about stud 32. Due to the bias exerted by spring 34 against tab 35, notch 36 of drive arm 30 engages drive tab 42 on arm 40, causing arm 40 to reciprocate in unison with plunger 20, drive stud 32, and drive arm 30. Reciprocation of slide arm 40 causes ratchet drive plate 50 to rotate counterclockwise about shaft 31, driven by stud 44. As plate 50 rotates, ratchet pawl 52 is urged into contact with ratchet gear 54 by spring 55. Engaging tooth 52A then pulls against the teeth of ratchet gear 54 to rotate it counterclockwise about shaft 13. Ratchet gear 54 is a part of or otherwise connected to film advance gear 59 so that the rotation of gear 59 is directly related to the rotation of ratchet gear 54. As gear 59 is rotated, cartridge gear 17, meshed therewith, rotates clockwise causing spool 18, which may be an integral part of cartridge gear 17, to also rotate clockwise. Slot 19 in spool 18 retains film end 14A and causes film 14 to wrap around spool 18 as it rotates with cartridge gear 17, thereby advancing the film. As the plunger 20 extends away from ratchet gear 54, drive arm 30 and slide arm 40 are drawn therewith by pivot stud 32. This rotates ratchet plate 50 clockwise causing engaging tooth 52A of pawl 52 to ride over the teeth of ratchet gear 54 as pawl 52 moves with ratchet plate 50. Ratchet gear 54 remains stationary, as does cartridge gear 17, spool 18, and film 14.

As film 14 advances as noted in FIG. 1, including film perforations 16, metering finger 70 encounters said perforation 16, extends therethrough, and moves in the direction of film motion. This movement of finger 70 rotates metering lever 75 clockwise about point 76 moving tab 78 in aperture 81. Tab 78 urges disengaging member 80 to slide in slot 82 towards drive arm 30 causing end 83 to contact arm 30 and rotate drive arm 30 clockwise about stud 32 overcoming the bias of spring 34. Said rotation forces notch 36 out of engagement with drive tab 42, interrupting the drive link between plunger 20 and slide arm 40. This interruption accurately positions the film yet allows further activation of plunger 20 without causing further film advance. As it reciprocates, stud 32 moves in slot 41 of drive arm 40 and slot 11 of camera body 10, yet no movement of drive arm 40 is effected as drive arm 30 is disengaged from drive tab 42.

In response to the actuation of the shutter release button, metering finger 70 is retracted from film perforation 16 and returns to its rest position as shown in FIG. 1 due to the bias of spring 72. Metering lever 75 rotates counterclockwise about point 76 to move tab 78 in aperture 81. These operations may be accomplished simultaneously, or finger 70 may be retracted prior to actuation of the shutter release button. Movement of tab 78 causes disengaging member 80 to retract, allowing and resulting in spring 34 rotating drive arm 30 about stud 32 until notch 36 again engages drive tab 32 to reestablish the drive train between plunger 20 and slide arm 40. Thus, the film advance mechanism is in the enabled mode permitting further film advance.

As indicated by this description of the preferred embodiment, the instant invention provides a film advance mechanism which automatically disables and enables itself in response to a film perforation, allowing unlimited reciprocation of the plunger. This is accomplished with a relatively simple mechanism which is easy to manufacture and assemble and is trouble free in operation.

The invention has been described in detail with particular reference to a preferred embodiment and the operation thereof, but it is understood that variations, modifications, and the substitution of equivalent mechanisms can be effected within the spirit and scope of this invention.

I claim:

1. In a photographic camera, particularly in a still camera for use with (1) photographic roll film to be advanced along a film plane and having a row of perforations, one for each film frame, and (2) metering means movable between a retracted position and an extended position, said retracted position on one side of an exposure plane and said extended position traversing said exposure plane by extending through one of the film perforations to detect its presence, a film advance mechanism comprising:

(a) reciprocating drive means comprising at least two adjacent and substantially collinear members, said first member movable with respect to said second member from an enabled position to a disabled position, said enabled position causing said second member to move in unison with said first member and said disabled position allowing said first member to reciprocate independently of said second member;

(b) drive disabling means movable from a rest position to an extended position, said extended position causing movement of said first member of said reciprocating drive means to said disabled position in response to the movement of said metering means to its extended position, whereby said film advance mechanism is disabled allowing said first member to reciprocate independently of said second member; and (c) drive reenabling means to move said drive disabling means to a rest position and allow said first member of said reciprocating drive means to move to said enabled position, whereby said film advance mechanism is enabled causing said second member to move in unison with said first member.

2. A film advance mechanism as claimed in claim 1 wherein (a) said second member of said reciprocating drive means further includes:
        (1) a first end,
        (2) a second end including a slot, and
        (3) a tab intermediate said first end and said second end; and (b) said first member of said reciprocating drive means further includes:
        (1) a first end including a stud, said stud occupying a portion of said slot in said second member, and (2) a second, notched end to engage said tab on said second member;
wherein said second, notched end of said first member engages said tab on said second member when said drive means is in said enabled position.

3. A film advance mechanism as claimed in claim 1 further comprising biasing means for urging said first member towards an enabled position.

4. A film advance mechanism as claimed in claim 2 further comprising biasing means for urging said second, notched end of said first member of said drive means towards engagement with said tab on said second member.

5. A film advance mechanism as claimed in claim 1 further comprising biasing means for urging said drive disabling means towards an extended position.

6. A film advance mechanism as claimed in claim 2 wherein said drive disabling means comprises a member having a first end connected to said metering means and a second end for contacting said second, notched end of said first member of said reciprocating drive means for urging said notched end out of contact with said tab of said second member.

7. In a photographic camera, particularly in a still camera for use with photographic roll film to be advanced along a film plane and coiled about a take-up spool, said film having a row of perforations, one for each film frame, a film advance mechanism comprising:
(a) plunger means mounted for reciprocal movement in said camera;
(b) take-up spool advance means to engage and rotate said take-up spool;
(c) ratchet means to rotate said take-up spool advance means only when said ratchet is rotated in one direction;
(d) reciprocating drive means comprising at least two adjacent and substantially collinear members, said first member connected to said plunger means for substantially reciprocal movement therewith, and said second member connected to said ratchet means for at least partial rotation of said ratchet means, said first member movable with respect to said second member from an enabled position to a disabled position, said enabled position causing said second member to move in unison with said first member and said disabled position allowing said first member to reciprocate independently of said second member;
(e) metering means movable between a retracted position and an extended position, said retracted position on one side of an exposure plane and said extended position traversing said exposure plane by extending through one of the film perforations to detect its presence;
(f) drive disabling means movable from a rest position to an extended position, said extended position causing movement of said first member of said reciprocating drive means to said disabled position in response to the movement of said metering means to its extended position; and
(g) drive reenabling means to move said drive disabling means to a rest position and allow said first member of said reciprocating drive means to move to said enabled position.

8. A film advance mechanism as claimed in claim 7 wherein
(a) said second member of said reciprocating drive means further includes:

(1) a first end connected to said ratchet means for at least partial rotation of said ratchet means,
(2) a second end including a slot, and
(3) a tab intermediate said first end and said second end; and
(b) said first member of said reciprocating drive means further includes:
(1) a first end connected to said plunger means by a stud, said stud occupying a portion of said slot in said second member, and
(2) a second, notched end to engage said tab on said second member; wherein said second, notched end of said first member engages said tab on said second member when said drive means is in said enabled position.

9. A film advance mechanism as claimed in claim 7 further comprising biasing means for urging said first member towards an enabled position.

10. A film advance mechanism as claimed in claim 8 further comprising biasing means for urging said second, notched end of said first member of said drive means towards engagement with said tab on said second member.

11. A film advance mechanism as claimed in claim 7 further comprising biasing means for urging said drive disabling means towards an extended position.

12. A film advance mechanism as claimed in claim 8 wherein said drive disabling means comprises a member having a first end connected to said metering means and a second end for contacting said second, notched end of said first member of said reciprocating drive means to urge said notched end out of contact with said tab of said second member.

13. In a photographic camera, particularly in a still camera for use with photographic roll film to be advanced along a film plane and coiled about a take-up spool, said film having a row of perforations, one for each film frame, a film advance mechanism comprising:
(a) plunger means mounted for reciprocal movement in said camera and accessible outside said camera for actuation by a picture taker;
(b) take-up spool advance means to engage and rotate said take-up spool;
(c) ratchet means to rotate said take-up spool advance means only when said ratchet means is rotated in one direction;
(d) reciprocating drive means comprising a first and second adjacent and substantially collinear members, said second member including: a first end connected to said ratchet means for at least partial rotation of said ratchet means, a second end including a slot, a tab intermediate said first end and said second end; and
said first member including: a first end connected to said plunger means by a stud, said stud occupying a portion of said slot in said second member, and a second, notched end to engage said tab on said second member; said first member movable with respect to said second member from an enabled position to a disabled position, said enabled position causing said second member to move in unison with said first member and said disabled position allowing said first member to reciprocate independently of said second member;
(e) biasing means urging said first member to its enabled position with respect to said second member;
(f) metering means movable between a retracted position and an extended position, said retracted position on one side of an exposure plane and said extended position traversing said exposure plane by extending through one of the film perforations to detect its presence;

(g) drive disabling means movable from a rest position to an extended position to overcome said first member biasing means, said extended position causing movement of said first member of said reciprocating drive means to said disabled position in response to the movement of said metering means to its extended position;

(h) biasing means urging said drive disabling means toward its extended position; and (i) drive reenabling means to overcome said disabling means bias and move said drive disabling means to a rest position and allow said first member of said reciprocating drive means to move to said enabled position.

14. A film advance mechanism as claimed in claim 13 wherein said second, notched end of said first member engages said tab on said second member when said drive means is in said enabled position.

15. A film advance mechanism as claimed in claim 13 wherein said drive disabling means comprises a member having a first end connected to said metering means and a second end for contacting said second, notched end of said first member of said reciprocating drive means to urge said notched end out of contact with said tab of said second member.

* * * * *

UNITED STATES PATENT AND TRADEMARK OFFICE
CERTIFICATE OF CORRECTION

PATENT NO.   :   4,211,479
DATED        :   July 8, 1980
INVENTOR(S)  :   Arthur Zawodny It is certified that error appears in the above-identified patent and that said Letters Patent are hereby corrected as shown below:

Column 3, line 27, "arm" should read --arms--.
Column 3, line 50, "th" should read --the--.
Column 4, line 38, "flow" should read --film--.
Column 5, line 22, the numeral "31" should read --13--.

Signed and Sealed this

Twentieth Day of January 1981

[SEAL]

Attest:

RENE D. TEGTMEYER

Attesting Officer     Acting Commissioner of Patents and Trademarks